June 12, 1962 J. D. THACKREY 3,038,302
METHOD AND MEANS FOR SIMULTANEOUSLY ADMITTING
AND IGNITING LIQUID PROPELLANT
Filed Aug. 30, 1956 2 Sheets-Sheet 1

INVENTOR.
JAMES D. THACKREY
BY
D. Gordon Angus
ATTORNEY.

June 12, 1962  J. D. THACKREY  3,038,302
METHOD AND MEANS FOR SIMULTANEOUSLY ADMITTING
AND IGNITING LIQUID PROPELLANT
Filed Aug. 30, 1956  2 Sheets-Sheet 2

INVENTOR.
JAMES D. THACKREY
BY
ATTORNEY.

United States Patent Office 3,038,302
Patented June 12, 1962

3,038,302
METHOD AND MEANS FOR SIMULTANEOUSLY ADMITTING AND IGNITING LIQUID PROPELLANT
James D. Thackrey, Pasadena, Calif., assignor to Aerojet-General Corporation, Azusa, Calif., a corporation of Ohio
Filed Aug. 30, 1956, Ser. No. 607,196
6 Claims. (Cl. 60—35.6)

The present invention relates to a method and means for securing substantially simultaneous admission and ignition of liquid propellant in the combustion chamber of a rocket motor.

Rocket propellants require careful control to secure steady burning and to avoid risk of detonation from an accumulation of fuel in the combustion chamber caused by the igniting means having ceased to function before the fuel has ignited, which will probably result in a hazardous detonation should the igniting means be recycled, or by starting the rocket fuel injection ahead of the functioning of the ignition means.

According to my invention, ignition is effected by a squib which causes combustion of a pyrotechnic device or cartridge to provide initial ignition of the rocket propellant. The duration of burning of the cartridge is a few seconds only, and for this reason the admission of the propellant, in a manner such that ignition thereof may be effected with maximum efficiency, is effected substantially simultaneously with, that is within fractions of a second of, the ignition of the pyrotechnic device in the combustion chamber.

It is an object of the invention to secure substantially simultaneous ignition of the pyrotechnic device in the combustion chamber of rocket motors of the kind described and the admission of the propellant thereto.

It is a further object of the invention to provide a simple one-shot device adapted to secure substantially simultaneous admission of propellant to an auxiliary rocket motor and ignition thereof by a sealing and igniting device capable of quick replacement when opportunity occurs.

Still further objects and features of the invention will hereinafter appear from the following specification and accompanying drawings.

With the above and other objects in view, the invention comprises a propellant injection port sealing member held in position by a cartridge adapted to be electrically detonated to release the sealing member, said cartridge containing pyrotechnic material ignited by the detonation of the cartridge, to effect both freeing of the inlet port and ignition of propellant injected into the combustion chamber through said port.

The invention is particularly intended for use as a safety device for helicopters, especially of the type used for crop dusting, in which a sudden hazard may require an immediate short burst of extra power. Such helicopters are usually within reach of landing places at which the pilot can service the rocket motor when more propellant is required and replace the pyrotechnic device.

The device of this invention is well adapted to be incorporated in light helicopters as a fitting to the tips of the rotors thereof by reason of its light weight and absence of auxiliary parts requiring driving means for their operation. Since the rotation of the helicopter blades generates very considerable centrifugal forces even at low speeds, it is essential that any auxiliary power unit mounted on the tip of the blade, in which position it of course exerts maximum force, must be as light as possible and this requirement is ideally met by the provision of a rocket motor utilizing centrifugal force to draw propellant from a tank arranged at the midpoint of the rotor and deliver it under considerable pressure to the combustion chamber. By providing simple means such as a hand pump, the fuel tank may also be pressurized to supply fuel to the rotor when making a start.

In any use of a rocket motor where light weight is essential, the use of the means of this invention enables a considerable reduction of weight to be realized over that of a conventional rocket engine.

Figure 1:
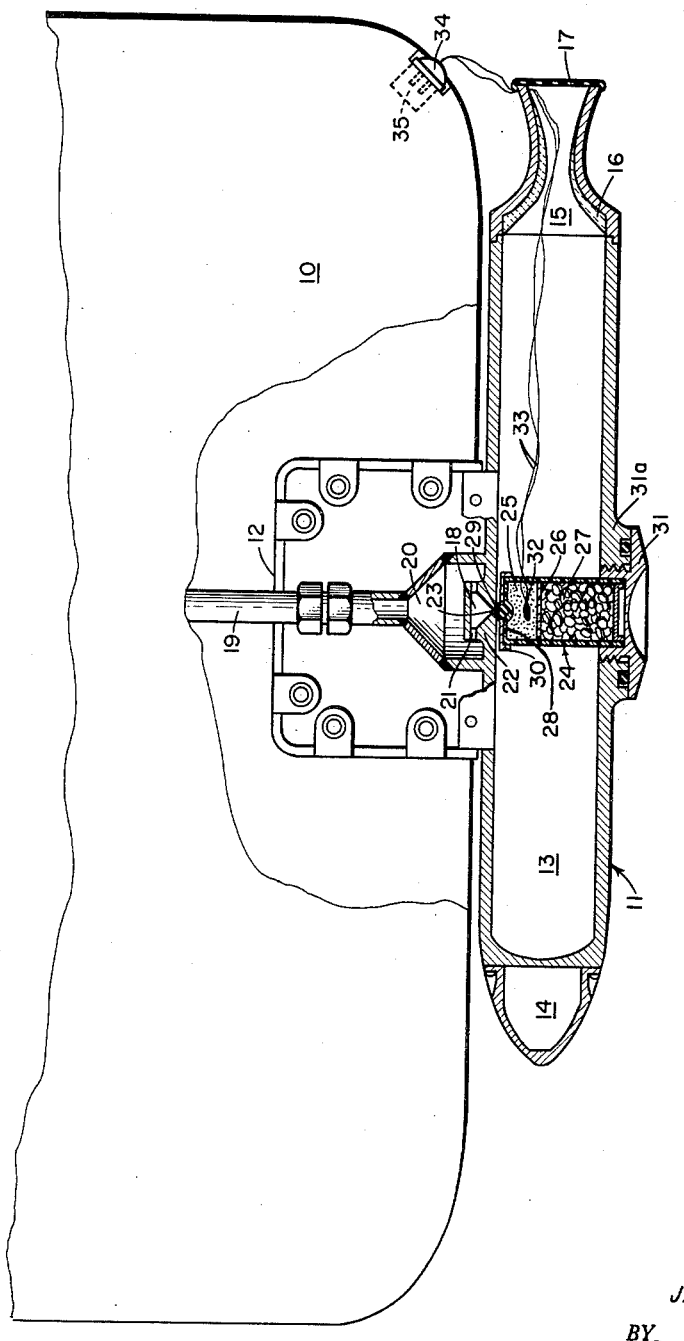
FIG. 1 is a horizontal section through a small rocket engine embodying the invention and utilizing a monopropellant.

Referring now to FIG. 1, the numeral 10 indicates the tip of a helicopter blade on which small rocket motor 11 is permanently mounted by a plate 12 which may be welded to the rocket body. The rocket motor comprises a combustion chamber 13, a hollow stream-lined nose 14 and an exhaust nozzle 15 provided with a ceramic lining 16. Preferably the exhaust nozzle is fitted with a rubber cap 17 which is blown off the motor when it is put into operation. Monopropellant is supplied to the rocket motor through port 18 through supply pipe 19 connected to a tank (not shown). The tank may be pressurized or the centrifugal force acting on the propellant in the fuel line may be relied on to generate pressure adequate for injecting the propellant into the combustion chamber. The propellant inlet port structure comprises a manifold 20 from which fuel flows through tangential passages 21 into a fuel spray head 22. Spray head 22 is provided with an injection orifice 23 arranged to inject the propellant as a whirling spray.

A cartridge generally indicated at 24 is provided with a wall of readily frangible material such as a cellulose base plastic and comprises a compartment 25 under the end of the cartridge facing the injection port 18. The compartment 25 contains an explosive charge and is divided by a partition 26 from a compartment 27 in which pyrotechnic material is packed. The material in the compartment 27 may be in the form of pelletized propellant grain or a "Thermit" type material. The cap 28 closing the end of the cartridge under the injection valve 18 is provided with a depression in which is mounted a sealing member such as a resilient ball 29 of neoprene rubber or like substance. A positioning ring 30 is mounted on cap 28 to retain the ball in position. The opposite end of the cartridge is securely positioned in a hollow plug 31 which is screwed into a threaded exterior boss 31a on the wall of the combustion chamber. A squib 32 is positioned in the explosive charge in compartment 25 and electrical leads 33 connected to the squib are passed through the exhaust nozzle and under the edge of the rubber cap 17, their ends being fitted in plug 34 which is received in an electrical socket 35 provided in the edge of the rotor blade 10.

It can be appreciated that when the squib 32 is detonated the explosive charge in compartment 25 will be ignited. This causes the collapse of the frangible walls of the cartridge 24 which in turn causes the sealing member 29 to be dislodged from the injection port 18. Igniting the charge in compartment 25 also causes ignition of the pyrotechnic material in compartment 27 so that propellant injecting from port 18 into the combustion chamber 13 will be ignited by the burning pyrotechnic material.

It will be noted that the parts above described for insuring simultaneously injection and ignition of the propellant are arranged in such a way that no undesirable stresses are set up due to the action of centrifugal force.

A quiescent zone exists between the injection port and the head of the combustion chamber 13 and it is believed that this space facilitates steady burning of the propellant.

Figure 2:
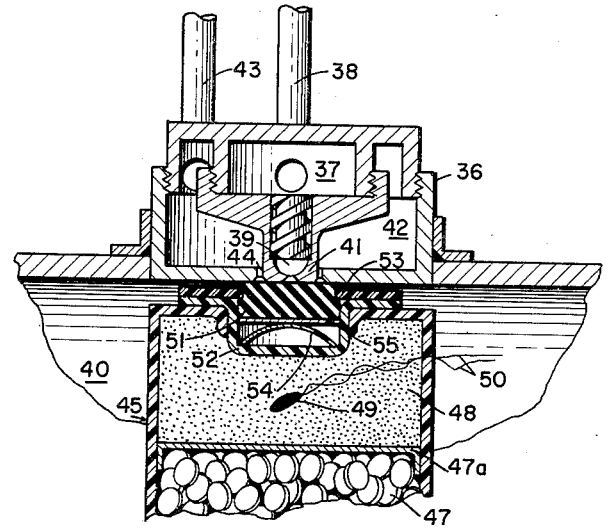
FIG. 2 is a fragmentary horizontal cross section drawn on a larger scale, showing the invention applied to a rocket engine utilizing a bi-propellant.

Rocket motors are very commonly provided with both a fuel and an oxidizer necessitating two supply lines and the form of the invention illustrated in FIG. 2 is designed to insure simultaneous injection and ignition of both fuel and oxidizer.

The manifold 36 provides a chamber 37 to which fuel is delivered through pipe 38 from a fuel tank (not shown). Fuel may be placed under pressure by any suitable means or the centrifugal force acting on the fuel in the pipe 38 may be relied on to afford sufficient pressure. An outlet passage for the fuel is indicated at 39 from which the fuel is injected into the combustion space 40 through a spray head 41 of any suitable kind, shown by way of example as incorporating a spinner. A chamber 42 is arranged in the manifold surrounding chamber 37 and oxidizer is delivered to chamber 42 through pipe 43 from a tank (not shown). The oxidizer will be placed under pressure in a similar manner to the fuel as previously referred to. The chamber 42 communicates with the combustion chamber through an outlet opening formed as an annular slit 44 surrounding the fuel injection opening 39. It should be noted that both openings 44 and 39 are arranged in a common plane. A cartridge 45 having a wall of frangible material is held in position similarly to the arrangement described with reference to FIG. 1.

The cartridge comprises a chamber 47 containing pyrotechnic material separated by a partition 47a from an explosive charge 48 in which a squib 49 is mounted. Leads 50 are connected to the squib and are led to an electrical socket on the tip of the rotor blade. A disk or sealing member 51 of resilient material such as neoprene rubber, is positioned in a cup 52 inserted in an opening in the end of cartridge 45, a retaining ring 53 being provided to hold the disk in place. A cone spring 54 is arranged between a disk 55 of stiff material underlying the resilient disk 51 and the bottom of the cup. The cone spring serves to urge the disk 51 in sealing position against the manifold 36 thus closing the fuel injection opening 39 and the oxidizer outlet opening 44. The cartridge 45 functions in the same manner as the cartridge shown in FIGURE 1. Detonation of the cartridge dislodges the disk 51 from the openings 39 and 44 thus permitting fuel and oxidizer to be injected into the combustion chamber where it is almost simultaneously ignited by burning pyrotechnic material stored in chamber 47.

Figure 3:
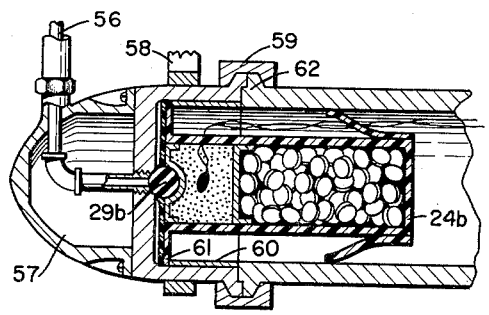
FIG. 3 is a fragmentary horizontal cross section through a rocket engine having a different arrangement from that shown in FIG. 1 for effecting simultaneous admission and ignition of a monopropellant.

FIG. 3 shows the simultaneous propellant injection and ignition means of the invention incorporated in a rocket engine in which a monopropellant is injected at the forward end of the combustion chamber through a pipe 56 led into the nose section 57 of the rocket engine.

The nose section is shown as permanently secured to the rotor tip by a bracket 58 but the combustion chamber and nozzle may be held to the rotor tip by a readily released bracket (not shown) and are secured to the nose section by a releasable clamp ring 59.

The cartridge case 24b is held firmly in position against the forward end of the combustion chamber by removable sleeve 60 engaging against a peripheral shoulder 61 on the cartridge case. The sleeve 61 is forced forward by the engagement of its rear end by the edge of the flange 62 provided at the forward end of the combustion chamber for engagement by the locking flange 59. This embodiment functions in the same manner as the embodiment illustrated in FIGURE 1.

It is mentioned that while a readily destroyed cartridge containing both an explosive and a pyrotechnic charge have been described, the scope of the invention extends to include a cartridge formed of material which may be destroyed by rapid and intense combustion set off by any suitable primer actuated by the operator.

While preferred embodiments of the invention have been described, and shown in the drawings, it is to be understood that said embodiments are given by way of example only and not as limitative of the invention, the scope of which is defined by the appended claims.

I claim:

1. In a liquid propellant rocket engine means for insuring substantially simultaneous injection and ignition of propellant in the combustion chamber of the engine, comprising: a propellant injection port opening into the combustion chamber; a cartridge positioned in said combustion chamber and having a wall of readily fragmented material; an injection port sealing member of resilient material mounted on said cartridge and held thereby in sealing engagement against said port until the cartridge is fragmented; an explosive charge within said cartridge; a charge of pyrotechnic material also contained in said cartridge; and an electrically operated means for igniting said explosive charge to substantially simultaneously free the injection port and ignite the pyrotechnic material to initiate ignition of the propellant.

2. In a liquid propellant rocket engine means for insuring substantially simultaneous injection and ignition of propellant in the combustion chamber of the engine, comprising: a propellant injection port opening into the combustion chamber; a cartridge positioned in said combustion chamber and having a wall of readily fragmented material; an injection port sealing member of resilient material mounted on said cartridge and held thereby on the surface thereof in sealing engagement with said port until the cartridge is fragmented; an explosive charge within said cartridge within the end thereof adjacent said sealing member; a charge of pyrotechnic material arranged to be ignited by the explosion of said explosive charge; and electrically operated means for igniting said explosive charge to substantially simultaneously free the injection port and ignite the pyrotechnic material to initiate ignition of the propellant.

3. In a liquid propellant rocket engine means for insuring substantially simultaneous injection and ignition of propellant in the combustion chamber of the engine, comprising: a propellant injection port opening into the combustion chamber; a cartridge positioned in said combustion chamber and having a wall of readily fragmented material; means mounting said cartridge in the combustion chamber so as to enable said cartridge before use and the debris thereof after use to be removed from the combustion chamber for inspection and renewal of the cartridge; an injection port sealing member of resilient material mounted on said cartridge and held thereby in sealing engagement against said port until the cartridge is fragmented; an explosive charge within said cartridge at the end adjacent the port sealing member; a charge of pyrotechnic material also contained in said cartridge; and an electrically operated means for igniting said explosive charge to substantially simultaneously free the injection port and ignite the pyrotechnic material to initiate ignition of the propellant.

4. A device as set forth in claim 3 in which said mounting means for the cartridge comprise: a threaded member recessed to receive and securely maintain the base of said cartridge in alignment with the injection port means, and a threaded boss on the wall of the combustion chamber in which threaded member is engaged.

5. In a liquid propellant rocket engine means for insuring substantially simultaneous injection and ignition of fuel and oxidizer, comprising: fuel and oxidizer injection ports closely adjacent one another in the wall of the combustion chamber; a cartridge positioned in said combustion chamber and having a wall of readily fragmented material; a sealing member of resilient material for said injection ports mounted on said cartridge and held thereby in sealing engagement against said ports until the cartridge is fragmented; an explosive charge within said cartridge; a charge of pyrotechnic material also contained in said cartridge; and an electrically operated means for igniting said explosive charge to substantially simultaneously free the injection ports and ignite the pyrotechnic material to initiate ignition of the fuel and oxidizer.

6. A device as set forth in claim 5 and in addition comprising resilient means mounted on said cartridge and operative to urge said sealing member of resilient material against said injection port.

References Cited in the file of this patent

UNITED STATES PATENTS

| | | |
|---|---|---|
| 2,518,882 | Goddard | Aug. 15, 1950 |
| 2,561,670 | Miller et al. | July 24, 1951 |
| 2,668,412 | Abramson | Feb. 9, 1954 |
| 2,711,630 | Lehman | June 28, 1955 |